United States Patent [19]

Swanlund

[11] 4,167,364
[45] Sep. 11, 1979

[54] CHEESE WRAPPING AND STACKING MACHINE

[75] Inventor: Steve Swanlund, Rochester, Minn.

[73] Assignee: The Kroger Company, Cincinnati, Ohio

[21] Appl. No.: 866,353

[22] Filed: Jan. 3, 1978

[51] Int. Cl.² ............................................. B65G 57/03
[52] U.S. Cl. ..................................... 414/46; 93/93 C; 198/422; 271/80; 414/80; 414/680
[58] Field of Search ..................... 214/6 R, 6 F, 6 FS, 214/6 D, 6 DS, 8.5 D, 8.5 C, 67 S, 1 PE, 1 BD, 1 BV, 147 T; 198/422; 271/80, 82; 93/93 C

[56] References Cited

U.S. PATENT DOCUMENTS

| | | | |
|---|---|---|---|
| 1,666,984 | 4/1928 | Willsea | 271/80 X |
| 2,585,076 | 2/1952 | Bandura et al. | 214/6 D |
| 3,611,887 | 10/1971 | Shibanuma et al. | 93/93 C |
| 3,633,731 | 1/1972 | Jones | 214/6 FS X |
| 3,772,971 | 11/1973 | Dutro et al. | 93/93 C |

*Primary Examiner*—Frank E. Werner
*Attorney, Agent, or Firm*—Cushman, Darby & Cushman

[57] ABSTRACT

An improved and modified cheese stacking machine for forming stacks of individually wrapped slices of cheese. Individual cheese slices are wrapped, cut and delivered in the machine to a discharge assembly where the individually wrapped slices are stacked one atop the other. A cam shaft rotates as the machine cycles and mounts a plurality of cams which operate cam switches to cause discharge of the stacks. An electrically operated clutch is provided between the cam shaft and the driving means, and an electro-optical sensor is mounted for sensing each slice as it is delivered to the discharge assembly. A counter is connected to the sensor for accumulating a count indicating the slices stacked since the last discharge, and the clutch operated upon a predetermined count to cause the stack to be discharged.

4 Claims, 2 Drawing Figures

CHEESE WRAPPING AND STACKING MACHINE

BACKGROUND AND SUMMARY OF THE INVENTION

The present invention relates to an improvement in a machine for forming stacks of cheese and discharging the same.

Conventional cheese stacking machines, for example, the Benhil Wrapper-Hockland Casting machine combination production line produces individually wrapped slices of processed cheese. These individually wrapped slices are delivered in ribbons, for example, twelve slices to a ribbon, to a discharge assembly where they are stacked and then pushed onto a flight chain for movement to another work area.

Such machines include a cam shift which is driven by the same motor which operates the discharge assembly and the structure which cyclically wraps, cuts and delivers the individual slices of cheese to that discharge assembly. The cam shaft mounts cams which in turn operate switches. These switches control the mechanical movement of the elements of the discharge assembly which cause the stacks of cheese to be delivered to a flight conveyor at a given point in the cycle at which a given number of cheese slices have been stacked. The cam shaft is geared so that delivery occurs after a given number of ribbons have been delivered to the machine. This arrangement, however, has several drawbacks.

First of all, it was difficult to change the number of ribbons of cheese which were stacked before the machine operated to push the cheese stacks onto the flight bar. A change could be made only by altering the gears but this was time consuming and difficult. Further, it was not possible to form a twenty slice stack and hitherto such stacks could be formed only by running two ten slice stacks and manually combining the stacks. Another difficulty was that if a defective ribbon was pulled from the line, then the stacks which would have included that ribbon would be one slice short.

The above drawbacks in this conventional type of machine are overcome according to the present invention by a simple and inexpensive modification thereof which does not substantially affect the operation of the machine. More particularly, a clutch is inserted between the cam shaft and the structure which drives the cam shaft to cause the discharge assembly to operate. An electro-optical sensor is mounted for detecting the actual presence of each slice of cheese as it is placed atop a stack in the discharge assembly. The electro-optical sensor is connected to an electrical counter which can be pre-set to any predetermined number. Upon the counter's accumulation of a count indicating the desired number, a control circuit actuates the clutch so that the driving structure and the cam shaft of the machine are once again coupled together. The discharge mechanism now operates normally to discharge the slices of cheese.

With the present modification, it is a simple matter to pick any size stack and to change that stack number by changing the setting on the electrical counter. At the same time, the modifications to the machine are minimal.

Many other objects and purposes of the above invention will become clear from the following detailed description of the drawings.

DETAILED DESCRIPTION OF THE DRAWINGS

Figure 1:
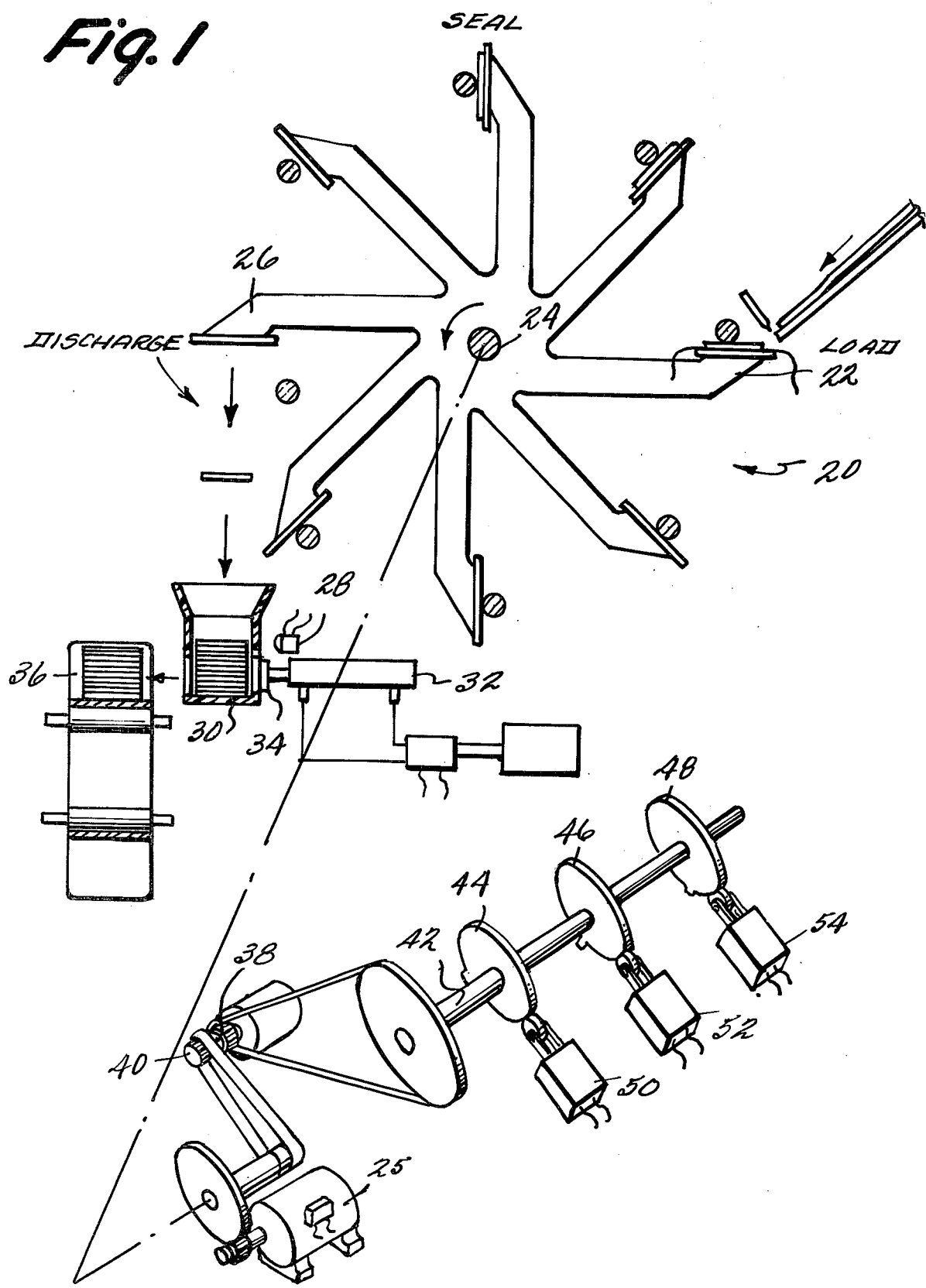
FIG. 1 shows a schematic view of the present modified machine.

Reference is now made to FIG. 1 which shows a schematic view of the cheese wrapper machine 20 of the present invention. As noted above, such machines are conventionally available and one machine which can be modified according to the present invention is identified above. Such machines receive continuous strips of cheese, typically twelve strips in parallel, cut the strips apart, wrap the strips to form ribbons of twelve pieces of cheese which are processed in parallel, seal the wrapped cheese pieces and deliver the same in parallel to a discharge assembly. Referring to FIG. 1, strips of cheese, e.g., twelve are delivered to flight bars 22 and are cycled by rotation of a central shaft 24 by motor 25. The individual cheese slices are wrapped and sealed at a station 26. At station 26, the ribbon is cut apart and the individually wrapped cheese slices fall into a plurality of slots forming a discharge chamber 30. As the twelve slices fall together into the chamber, the presence of one slice is detected by a conventional electro-optical sensor 28, which is connected to the counter of FIG. 2. The slices accumulate in discharge chamber 30 until the discharge mechanism 32 is operated. This mechanism includes a pusher plate 34 driven by a cam to push the twelve stacks onto a flight conveyor 36 where they are conveyed away for further processing. Since all of the above elements, particularly the conventional wrapping machine are conventional and well-known per se, no detailed description of the same is included.

The pusher plate of the discharge assembly is driven through a chain by motor 25. Gears can be provided to cause the discharge assembly to operate after a predetermined number of cycles, i.e., when a given number of slices have been accumulated in the discharge chamber. According to the present invention, however, a clutch 38 is provided between the driving shaft 40 and the cam shaft 42 which mounts a plurality of cams 44, 46 and 48. These cams operate conventional switches 50, 52 and 54, two of which control the proper operation of the discharge assembly.

Figure 2:
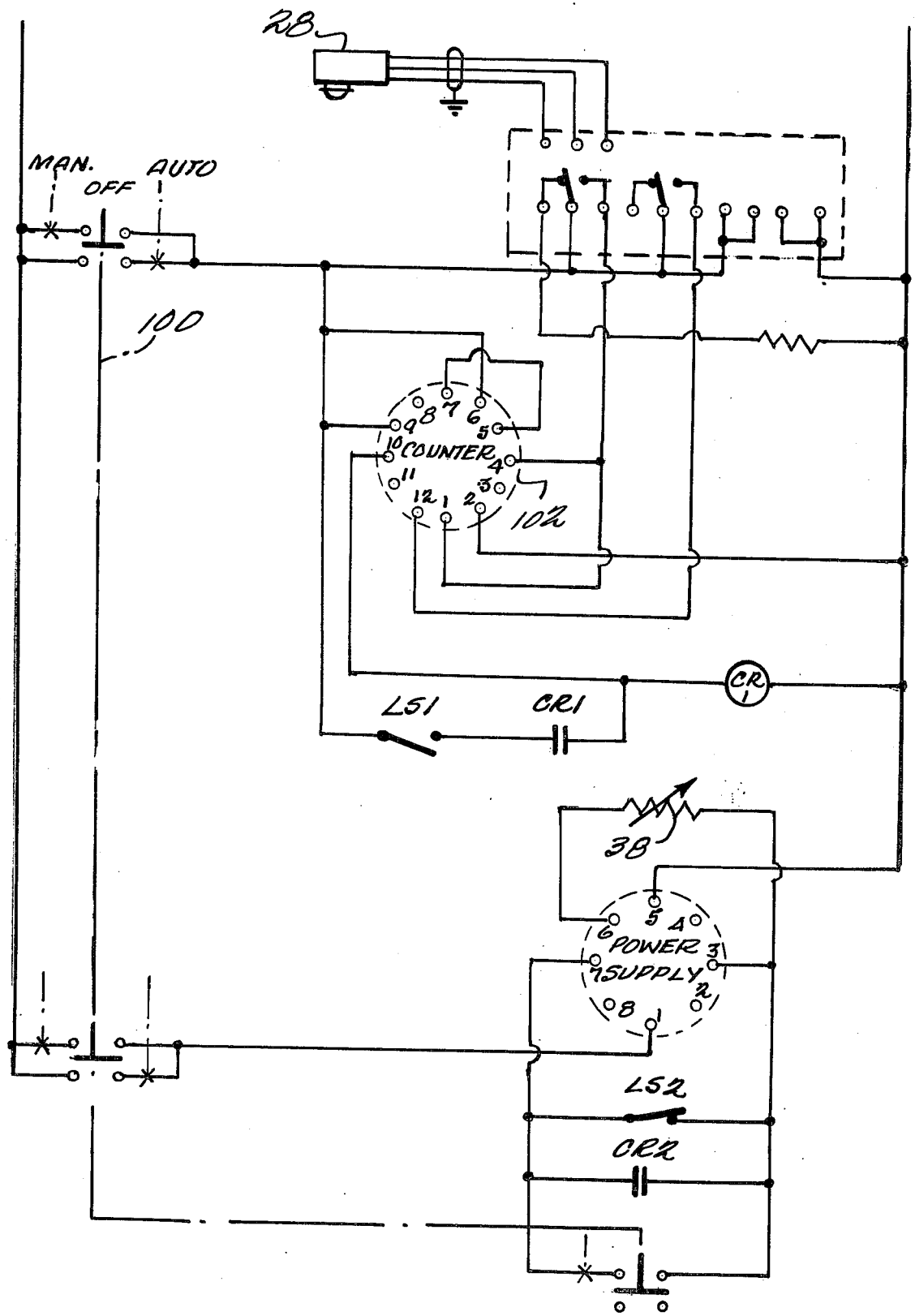
FIG. 2 shows an electrical schematic of the circuitry for controlling the modified machine in FIG. 1.

Reference is now made to FIG. 2 which shows a detailed schematic of the circuitry of the present invention. With the selector switch 100 in "Auto" position, and the machine cycling, clutch 38 will be energized through the normally closed limit switch LS2, causing cam shaft 42 to rotate.

As cam shaft 42 reaches the "home" position, switch LS2 will open and clutch 38 will de-energize, stopping cam shaft 42.

As the slices are fed onto the wrapper's flight bars, they pass the electro-optic sensor 28, which through its own relay contacts, energizes counter 102 causing it to count down one position from the counter's setpoint, the setpoint being adjustable and being determined by the stack height desired, e.g., a setting of 16 for a 16 high stack.

Clutch 38 will remain de-energized until enough flight bars containing product have passed the electro-optic sensor 28 causing counter 102 to count down to 0.

At this point, the control relay CR1 is energized and is latched through its own contacts CR1 and limit switch LS1. As CR 1 "makes", it energizes clutch 38 through its other set of contacts CR2, causing the main limit switch cam shaft to rotate.

As cam shaft 42 starts to move out of the "home" position, it operates the wrapper discharge limit switches causing the wrapper to discharge 12 stacks of slices of the preset height.

Limit switch LS2 closes as shaft 42 starts to rotate and limit switch LS1 opens, causing relay CR1 to de-energize. Clutch 38 remains energized through limit switch LS2 and cam shaft 42 continues to rotate until limit switch LS2 again opens in the "home" position. Clutch 38 then de-energizes and waits for another stack to be counted and repeats the same cycle. The wrapper machine 20 will cycle indefinitely without discharging until the preset number of slices has been reached.

With the selector switch 100 in the "hand" position, clutch 38 will remain energized through the selector switch contacts. The part of the wrapper's cycle at which the selector switch 100 is energized is now critical to the proper timing of the discharge.

The wrapper will discharge its product every 12 cycles in the "hand" position unless the timing gears are changed to acquire different stack heights. The discharge will operate at this preset number of cycles regardless of whether or not there is product on the flight bars.

Many changes and modifications in the above described embodiments of the present invention can of course be carried out without departing from the scope of the present invention. That scope, therefore, is intended to be limited only by the scope of the appended claims.

What is claimed is:

1. In a machine for forming stacks of individually wrapped slices of cheese having means for delivering said slices to a discharge assembly, one atop the next to form a stack,
   means for driving said delivering means and said discharge assembly,
   a cam shaft coupled to said driving means and mounting a plurality of cams,
   a plurality of cam switches mounted adjacent said cams for operation by said cams, and
   control means for causing operation of said discharge assembly as said switches are operated to cause discharge of said stacks, the improvement comprising:
     an electrically operated clutch between said cam shaft and said driving means,
     an electro-optical sensor mounted for sensing each slice delivered to said discharge assembly,
     an electric counter connected to said sensor for accumulating a count indicating the slices stacked since the last discharge, and
     means for operating said clutch to cause said discharge assembly to operate upon a given count in said counter to discharge the stack.

2. In a machine as in claim 1, further including a count down relay connected to said counter and having a first controlled switch which is connected in series with one of said cam switches, said relay being activated to close its first controlled switch when said counter accumulates said given count and a second controlled switch connected to said clutch for operating said clutch when said relay is actuated.

3. In a machine as in claim 2, wherein a second cam switch is connected in parallel with said second controlled switch.

4. In a machine as in claim 2, including a manually operable switch connected in parallel with said second controlled switch for maintaining said clutch operated when said manually operated switch is closed so that said discharge assembly is controlled by said cam switches.

* * * * *